United States Patent [19]

Krohn et al.

[11] 4,001,935
[45] Jan. 11, 1977

[54] ROVING CUTTER

[75] Inventors: Duane D. Krohn, Westminster; Samuel W. Culbertson, Arvada, both of Colo.

[73] Assignee: Binks Manufacturing Company, Franklin Park, Ill.

[22] Filed: June 12, 1975

[21] Appl. No.: 586,206

[52] U.S. Cl. .................................. 30/128; 30/180; 83/481

[51] Int. Cl.² ...................... B26B 17/00; B25F 3/00

[58] Field of Search ................. 30/128, 347; 83/98, 83/347, 348, 481, 666, 665, 664, 346; 239/DIG. 8, 336

[56] References Cited

UNITED STATES PATENTS

| | | | |
|---|---|---|---|
| 3,011,257 | 12/1961 | Bamberger | 30/128 |
| 3,034,213 | 5/1962 | Milligan | 30/128 |
| 3,123,307 | 3/1964 | Bradley | 239/336 |
| 3,431,616 | 3/1969 | Lewis | 30/347 X |
| 3,461,755 | 8/1969 | Gerew | 83/481 X |
| 3,491,443 | 1/1970 | Fram | 30/128 |
| 3,890,706 | 6/1975 | Johnson | 30/347 X |

*Primary Examiner*—Al Lawrence Smith
*Assistant Examiner*—J. C. Peters
*Attorney, Agent, or Firm*—Gary, Juettner

[57] ABSTRACT

A light weight, compact roving cutter for chopping fiberglass roving into short fiber segments, and used in conjunction with a hand-held resin spray gun, has a mounting plate containing an air inlet port for driving an air motor carried thereon, a snap-on cutter rotor or roller driven by the air motor and carrying a plurality of blades secured by single fastening means, a friction roller cooperable with the cutter roller and blades thereof for breaking or cutting the roving, means accessible to the operator for adjusting the clearance between the rollers and the contact of the friction roller with the blades while the cutter is operating, and means for matching the discharge pattern of the cut segments of roving to the spray pattern of the resin spray gun, including air jet means supplied with pressurized air separate from that supplied to the motor.

11 Claims, 10 Drawing Figures

ROVING CUTTER

BACKGROUND OF THE INVENTION

Fiberglass reinforced plastics have been widely accepted by industry. A particularly convenient mode of forming such reinforced plastics resides in the simultaneous spray application of liquid resin and cut or chopped fiberglass roving. Pursuant to this technique, a fiberglass cutter or chopper is mounted on a spray gun and fed with a continuous strand of roving which the chopper breaks into small pieces of predetermined length nd discharges into the liquid spray from the spray gun, whereby the cut or chopped fibers are wetted and sprayed simultaneously with the resin into a mold or other forming vehicle.

One type of prior art device for cutting or breaking fiberglass roving into short fibers is shown in U.S. Pat. No. 3,011,257 to Bamberger. Combined resin spray guns and choppers are shown by way of example in the U.S. Pat. Nos. to Anderson 2,933,125, Nawalanic 2,995,173 and Scheinert 3,212,717. The structures shown in these patents are rather large, heavy and cumbersome. More compact arrangements of a spray gun and a detachable cutter assembly are shown in the U.S. Pat. Nos. to Jones 3,155,320 and Fram 3,491,443. However, even the latter arrangements are quite heavy and cumbersome.

In general, fiberglass choppers comprise a cutter rotor or roller carrying a plurality of blades and a back-up roller between which the roving is fed, the blades bearing on the back-up roller and chopping or breaking the roving as it passes between the two rollers. To facilitate the cutting action, the back-up roller is usually comprised of a resilient surface material. If the contact between the two rollers is too severe the back-up roller or the blades, or both, wear quickly and have to be replaced; on the other hand, if there is insufficient contact, cutting is incomplete or does not occur. To solve this problem, the Jones U.S. Pat. No. 3,155,320 provided a simple adjustment for the back-up roller but had the disadvantages of necessitating stopping the cutter to make the adjustment and requiring both hands of the operator to do so. The Fram U.S. Pat. No. 3,491,443 provided a complicated, self-adjusting feature for the rollers, but had a non-driven cutter roller structure which was used with a driven back up roller. Further, the adjustment of Fram's roller was difficult and required that the cutter be stopped since the adjustment was not easily accessible to the operator. In addition, Fram utilized a third roller engaging the back up roller to aid in feeding the roving to the blades, but no adjustment was provided to vary the contact with the feed roller as the back up roller wore down.

The blades of the cutter roller or rotor wear and need to be replaced, and such should be done easily and quickly. However, replacement could not be quickly accomplished in prior art cutters. For example, in the structure of Jones U.S. Pat. No. 3,155,320 a total of eight separate fasteners had to be removed and replaced in order to change the blades. Further, the cutter rotor was usually held in place on the chopper and could not be removed as a unit so that blade replacement was quite difficult and time consuming.

Cutting the roving into short segments is just one function of the cutter; it must also distribute the cut fibers in a pattern compatible with that of the spray gun so that the cut fibers are completely, or nearly completely, wetted by the resin spray. While some prior art attempts have been made to achieve such result, many have avoided or ignored the problem. For example, Bamberger U.S. Pat. No. 3,011,257 attempted to avoid the problem by using a separate cutter and, presumably, a separate spray gun. Of course Bamberger's approach had the disadvantage of greatly increased labor costs in that two separate operations had to be performed. Another approach to the problem was taken by Fram U.S. Pat. No. 3,491,443, wherein exhaust air from the air motor and additional air from the air line were used to hold the cut fibers together during discharge, with the pattern of the cut fibers upon discharge depending mainly upon the physical shape of the outlet nozzle. Scheinert U.S. Pat. No. 3,212,717 discloses the use of air for conveying cut roving, but not for controlling the discharge pattern thereof, somewhat similar to Bamberger.

SUMMARY OF THE INVENTION

The roving cutter of the present invention overcomes and eliminates the disadvantages of the prior art and is particularly adapted to be used in conjunction with a resin spray gun. The cutter comprises a mounting plate, an integrated air motor, a cutter roller with a plurality of readily replaceable blades, a cooperating readily replaceable back-up or friction roller, an idler or roving feed roller, adjustment means for varying the clearances between all of the rollers, and means for matching the discharge pattern of the cut roving to the spray pattern of the resin spray gun.

In the cutter of the present invention, the air motor and chopper components are integrated in that the mounting plate forms an integral part of the motor and has air passages therein for the motor, thus resulting in a lighter, more compact cutter than in the prior art, and with more power per unit weight.

The cutter roller is directly driven by the air motor and is quickly releasable from the air motor shaft so that if the blades become worn new blades may be quickly installed simply by substituting a fresh cutter roller unit. In addition, the blades are held in the cutter roller by single fastening mens so that the blades themselves can be easily and quickly replaced. Similarly, a resilient friction surface on the back-up roller can be quickly and easily replaced when it becomes excessively worn.

The back-up roller is adjustable and provided with positive displacement adjustment means for varying the relative positions between it and both the cutter roller and the feed roll. Additionally, the adjustment means accommodates roller adjustment while the cutter is operating so that a dynamic clearance can be set instead of having to stop the cutter and effect adjustment by a "cut and try" method. The adjustment is such that the clearance between the feed roller and back-up roller and the clearance between the back-up roller and cutter roller are kept nearly equal at all times, and the adjustment is positive and not reliant on springs or spring pressure.

The means for matching the discharge pattern of the cut roving to that of the spray gun utilizes air jet means separate from the air motor and separately controllable so that the roving pattern is not dependent on motor speed or vice versa. Consequently, both the amount and the discharge pattern of the cut roving are individually and selectively controlled.

These and other advantages of the roving cutter of the present invention will become apparent from the following description taken in conjunction with the accompanying drawings.

DESCRIPTION OF THE PREFERRED EMBODIMENT

Figure 1:
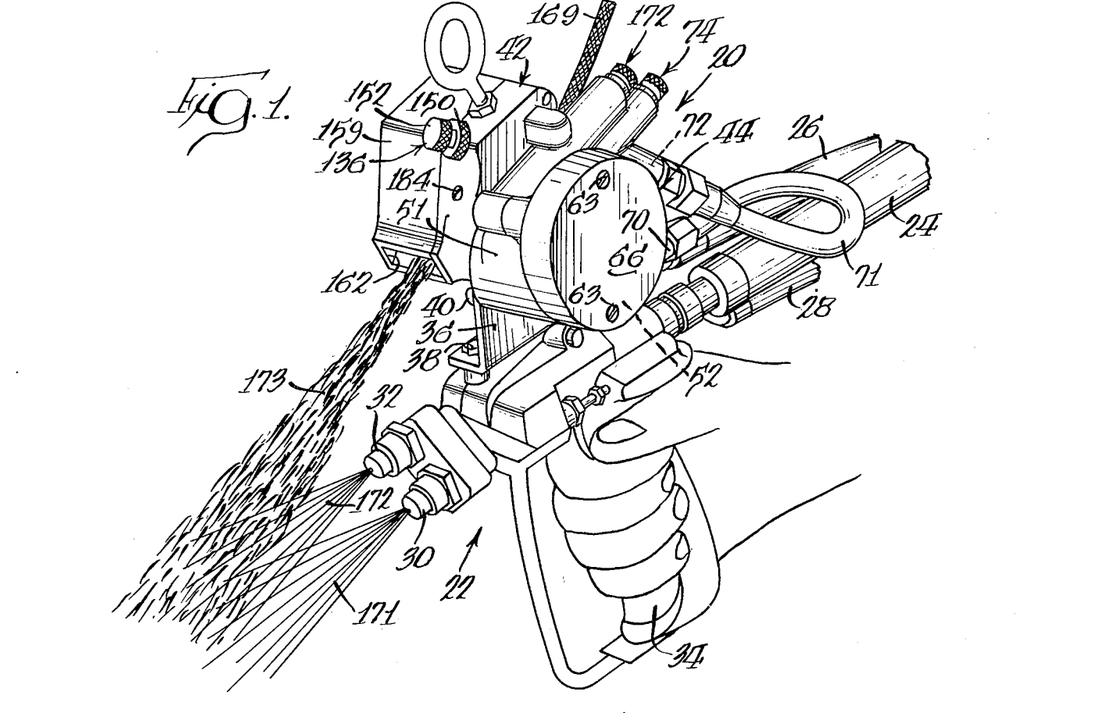
FIG. 1 is a frontal perspective view of a preferred embodiment of the roving cutter of the present invention shown assembled onto a resin spray gun.
Figure 2:
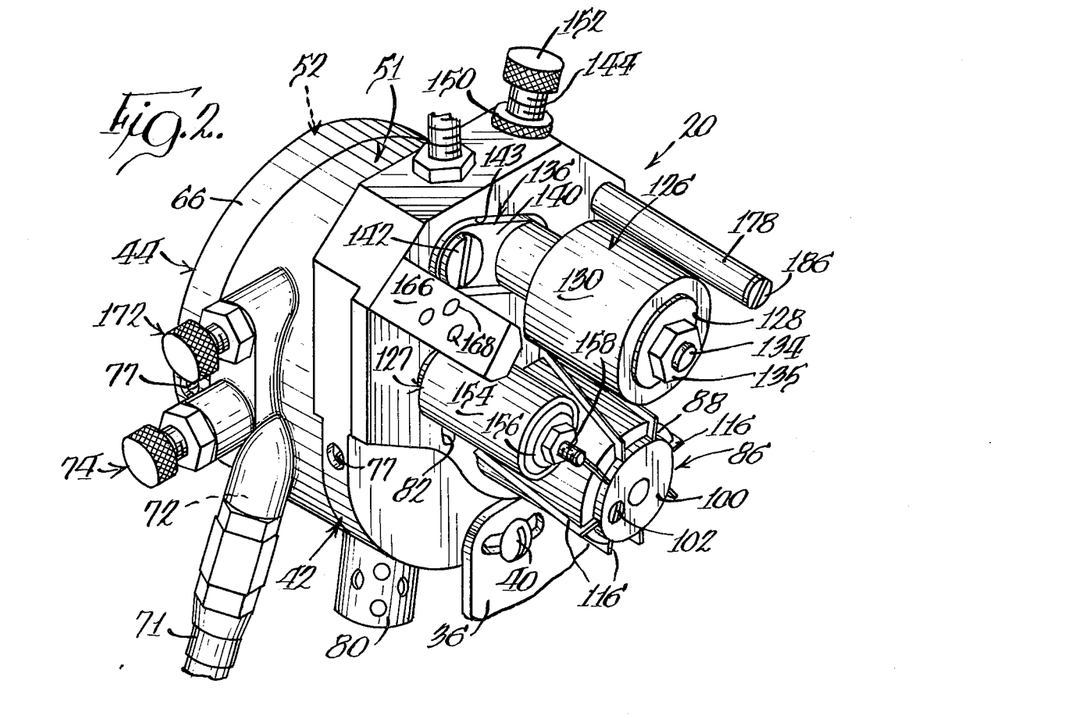
FIG. 2 is a perspective view of the roving cutter from the rear, with the roller cover removed.

In FIG. 1, a roving cutter or chopper 20 provided pursuant to the present invention is shown assembled onto a hand-held resin spray gun 22, such as disclosed in Krohn et al, U.S. Pat. Application Ser. No. 366,599, filed June 4, 1973, suitable for spraying plural component plastic materials such as polyester resins. The two components of the resin are supplied to the spray gun 22 by hoses 24 and 26, and are adapted to be individually sprayed from nozzles 30 and 32, under control of a manually operated trigger 34. The spray nozzles 30 and 32 are mounted in angularly convergent relationship so that the sprays therefrom commingle and intermix to form a suitable resin mixture. In addition, compressed air is supplied to the gun via hose 28, also under control of the trigger 34, for operating the chopper 20.

The chopper or cutter 20 is mounted on top of the spray gun 22 by means of an L-shaped bracket 36, the horizontal portion of the bracket having a rear opening and an arcuate forward slot for reception of screws 38 adjustably mounting the bracket on the gun, and the vertical portion of the bracket having a pair of arcuate slots therein for reception of screws 40 adjustably mounting the cutter on the bracket so that the cutter 20 may be pivoted both horizontally and vertically relative to the spray gun 22 to properly align its outlet with the liquid spray patterns from the nozzles 30 and 32.

The cutter 20 comprises a mounting plate 42 to which the screws 40 are secured. On one side, the mounting plate 42 carries and forms part of an air motor 44 which drives the cutter 20.

Figures 3, 6, 7, 8:
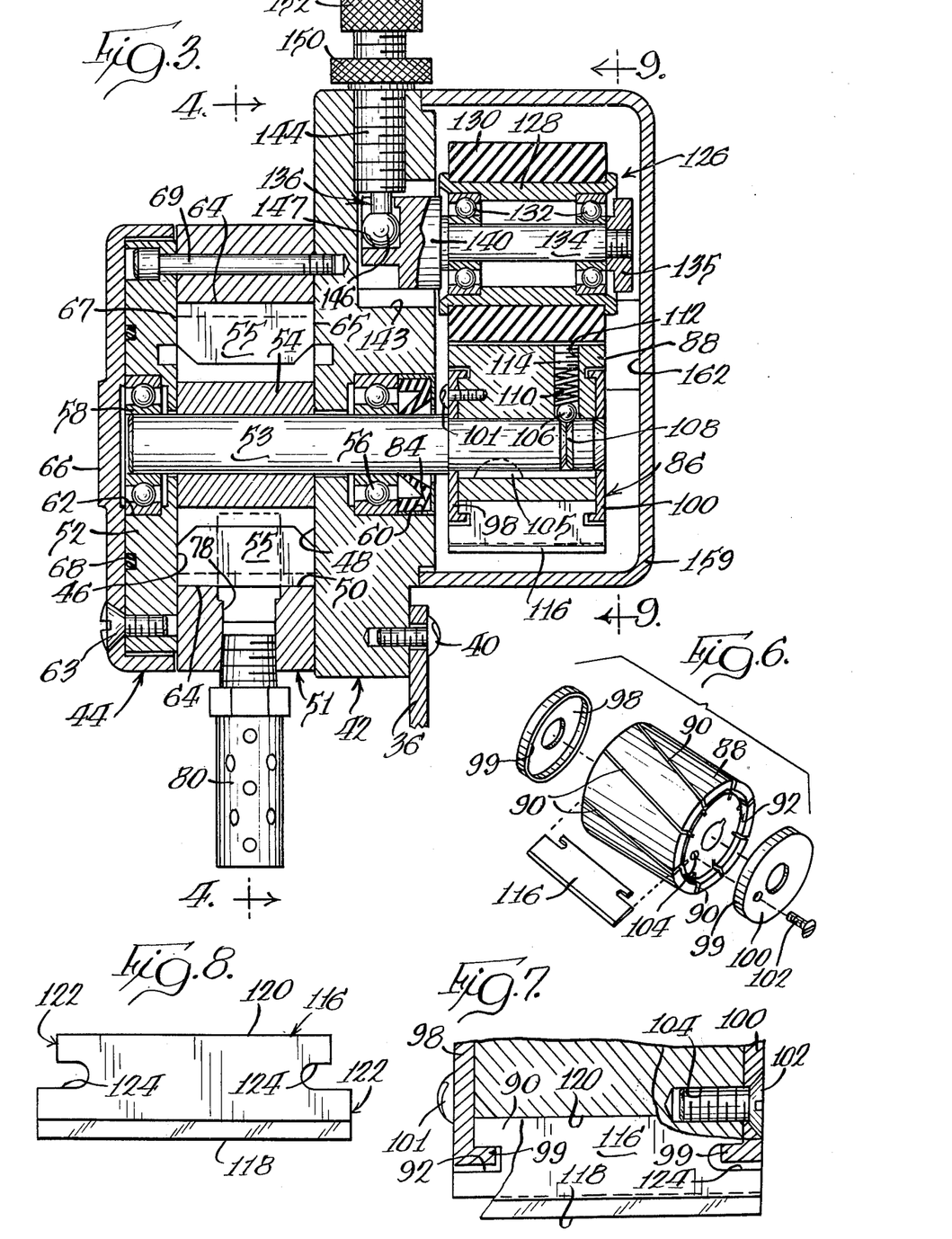
FIG. 3 is a generally vertical cross-sectional view of the cutter.
FIG. 6 is an exploded perspective view of the cutter roller and blades.
FIG. 7 is an enlarged fragmentary cross-sectional view of the cutter roller.
FIG. 8 is an enlarged elevational view of one of the cutter blades.

As shown in FIG. 3, the air motor 44 includes a rotor cavity 46 formed by a surface 48 of the mounting plate 42, a cylindrical opening 50 in a central body 51, and an end plate 52. A vaned rotor 54 having a shaft 53 is rotatably mounted in the cavity 46 eccentrically of the cylindrical opening 50 in the body 51. The shaft 53 of the rotor is journalled on bearings 56 and 58 located in the openings 60 and 62 in the mounting plate 42 and end plate 52, respectively. The rotor 54 has a plurality of radial slots therein, each of which slidably receives a radially extending vane 55. The radially outer edges 64 of the vanes 55 seal against the cylindrical peripheral wall of the opening 50, and the side edges 65 and 67 of the vanes seal against the mounting plate 42 and the end plate 52. Also, the ends of the rotor 54 seal against the surface 48 of the mounting plate 42 and the end plate 52.

The end plate 52 and central body 51 are aligned with one another and the mounting plate 42 by roll pins (not shown) and are secured in assembled relation by a plurality of cap screws 69. The end plate 52 is enclosed by a decorative cover 66 which is held in place by screws 63. The cover 66 cooperates with an O-ring 68 located in a groove in the outer surface of plate 52 to sel the bearing 58 and the one end of the cavity 46. A seal 84 is mounted about the shaft 53 in the opening 60 in the plate 42 to seal the bearing 56 and the opposite end of the air motor cavity 46.

Figure 4:
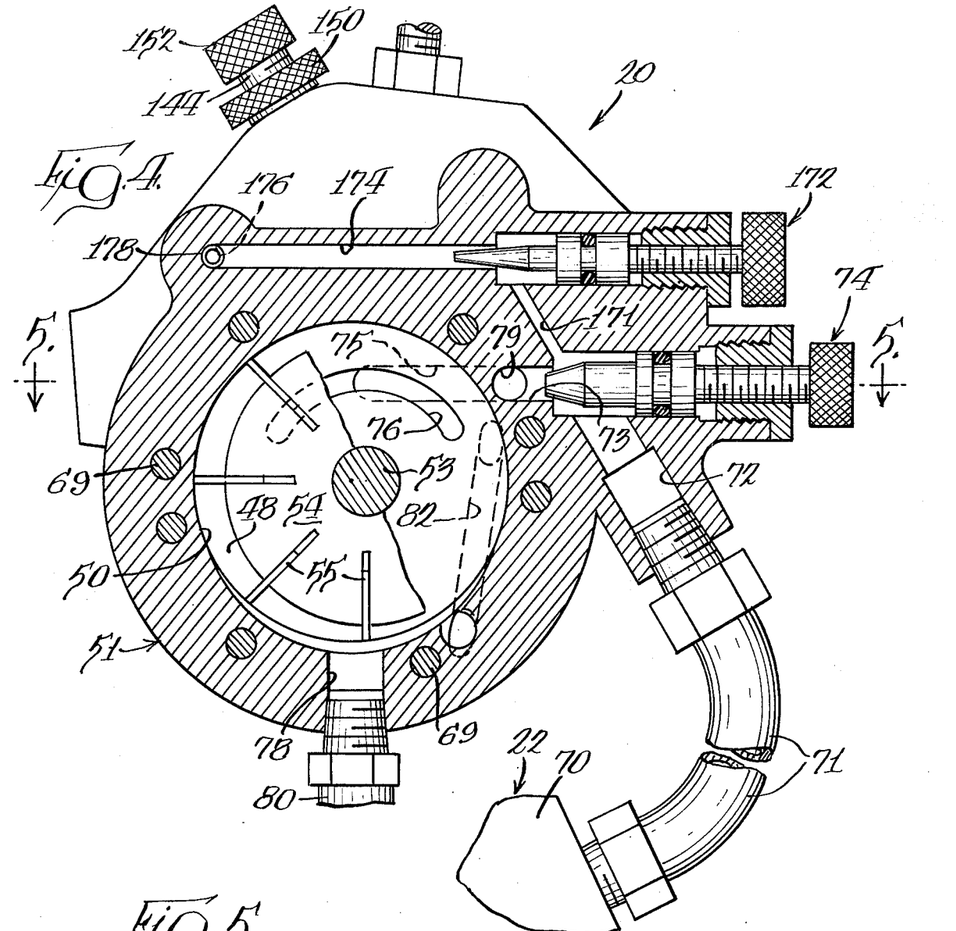
FIG. 4 is a vertical longitudinal section of the cutter, taken substantially along line 4—4 of FIG. 3, with portions thereof broken away.
Figure 5:
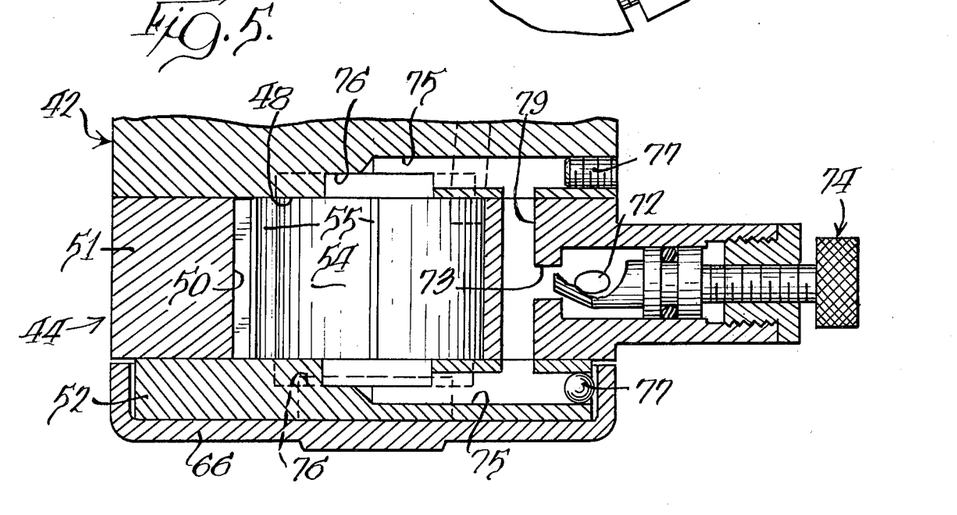
FIG. 5 is a fragmentary horizontal section, taken substantially along line 5—5 of FIG. 4.

Referring to FIGS. 4 and 5, air is supplied to the air motor 44 from a source of pressurized air, via a hose 71 extending between the air motor and an air outlet fitting 70 on the spray gun 22. The outlet fitting 70 is, of course, located downstream of the trigger 34, so that air is supplied to the motor of the cutter only when the gun trigger is actuated. The air hose 71 is connected to an inlet passge 72 in the central body 51 of the motor 44. A motor speed control passge 73 intersects the inlet passge 72, and the flow of air through the latter passage is regulated by a speed control valve 74 of the needle valve type located at the upstream end of passage 73; the valve including a stem threaded in the body 51 and extending to the exterior thereof and manually operable to control the amount of air fed to the motor and thus the speed of the motor. The passage 73 includes a transverse portion 79 in the central body 51 and extending into the plates 42 and 52 to communicate with horizontal passages 75 in the mounting plate 42 and the end plate 52, the latter passage in turn leading into arcuate air inlet ports 76 for the motor formed in the inner surfaces of the mounting plate 42 and the end plate 52 adjacent the rotor 54. The outer ends of the passage 75 may be closed by set screws or pressfit steel balls, as indicated at 77 in FIG. 5.

Air supplied under pressure to the ports 76 drives the motor in a conventional manner, counterclockwise as viewed in FIG. 4. Most of the air exits from the cavity 46 through a generally radial exhaust port 78 in the central body 51, the outer end of which is fitted with a muffler 80 to reduce noise. A small portion of the exhaust air is vented from the cavity 46 through a bore 82 in the mounting plate 42 for purposes hereinafter described.

As shown in FIG. 3, the shaft 53 of the air motor 44 extends through the opening 60 in the mounting plate 42 to the opposite side thereof, and carries and directly drives a cutter rotor or roller 86.

As shown in FIGS. 6 and 7, the cutter roller 86 comprises a generally cylindrical body 88 of about 1¼ inches in diameter, having eight slots 90 formed in the surface thereof. The slots 90 are not parallel to the longitudinal axis of the cutter but are inclined or skewed relative to said axis to distribute the fiber cutting or breaking action. The ends of the body 88 are recessed and have annular grooves 92 formed therein in communication with the slots 90. An inner end cap 98 having an axially extending projection or rim 99 of a diameter equal to but of a thickness less than that of the annular groove 92 is secured, as by screws 101, to the end of the body 88 adjacent the mounting plate 42. A similar outer end cap 100 having an identical rim 99 is releasably secured to the opposite or outer end of the body 88 by a single fastener, preferably in the form of a threaded screw 102 which engages in a threaded bore 104 in the body 88. Both the end caps 98 and 100 and the body 88 have central openings for receiving the shaft 53, and the end cap 98 and the body 88 have a key slot for slidable reception of a key 105 on the shaft 53, whereby the shaft and roller are connected for conjoint rotation. However, pursuant to the present invention, the cutter roller 86 is quickly releasable from the shaft 53 and is held thereon only by a snap-type connection such as by a ball 106 releasably engaging in an annular notch 108 in the shaft. The ball 106 is biased toward the shaft 53 by spring 110 located in an opening 112 in the body 88, the outer end of the opening 112 being closed by a plug 114. The notch 108 is so located on the shaft 53 that the inner end of the roller 86 is spaced a short distance from the mounting plate 42, whereby a screw driver can be inserted between the plate and the roller to pop the roller off the shaft.

Each of the slots 90 in the cutter roller 86 is adapted to carry a specially shaped cutting blade 116, one of which is shown in FIG. 8. Each blade 116 is a generally elongated, rectangular thin blade, much like a razor blade, with one longitudinal edge sharpened as indicated at 118. The opposite edge 120 of the blade is somewhat shorter in length, and the two side edges 122 are provided with inwardly extending notches 124. Each blade is so dimensioned relative to the slots 90 that the notches 124 align with the annular recesses 92 in the roller, so that when the blade is installed in the roller the rims 99 of the end caps 98 and 100 engage in the notches 124 and retain the blade in the roller 86. The blade is completely symmetrical about a plane midway between its edges 122 and therefore reversibly mountable in the roller.

By utilizing a roller approximtely 1¼ inches in diameter with eight equally spaced slots therein, and providing for mounting in the roller of any number of blades from one to eight, very convenient adjustment is provided for the length of the fiber segments into which the roving is cut. That is, with one blade, the roving would be cut into four inch long segments; with two equally spaced blades into two inch segments; with four equally spaced blades into one inch segments; and with eight blades into one-half inch segments. Generally, one-half inch segments and one inch segments are those most regularly desired. Also, mixed lengths could be obtained if desired by using other members and/or spacings of blades, for example, six to obtain some one-half inch long segments and some one inch long segments. In any event, with the end cap 100 removed, the desired number of blades are inserted in the selected slots 90 in the roller and slid into engagement with the rim 99 of the end cap 98, whereupon the cap 100 may be attached by the screw 102 to lock the blades on the rotor. Then the rotor is simply slid onto the shaft 53 with the key slots aligned with the key 105 until the ball 106 snaps into place in the groove 108.

Should it be desired to change the blades 116 on the cutter roller 86, a tool such as a screw driver may be inserted in the space between the mounting plate 42 and the roller 86 and the latter simply pried off the shaft 53. The single screw 102 is then removed along with the end cap 100, and the blades are exchanged. The cap 100 and screw 102 are then replaced, and the cutter rotor 86 is snapped back onto the shaft 53. Of course for a faster change, a second roller 86 with new blades therein could simply be substituted for the first roller.

In order to cut or break the roving as it passes thereover, and also to drive the roving, the cutter roller 86 cooperates with a back-up or friction roller 126. The roller 126 also cooperates with an idler or feed roller 127, hereinafter described, to feed the roving through the cutter.

Figure 9:
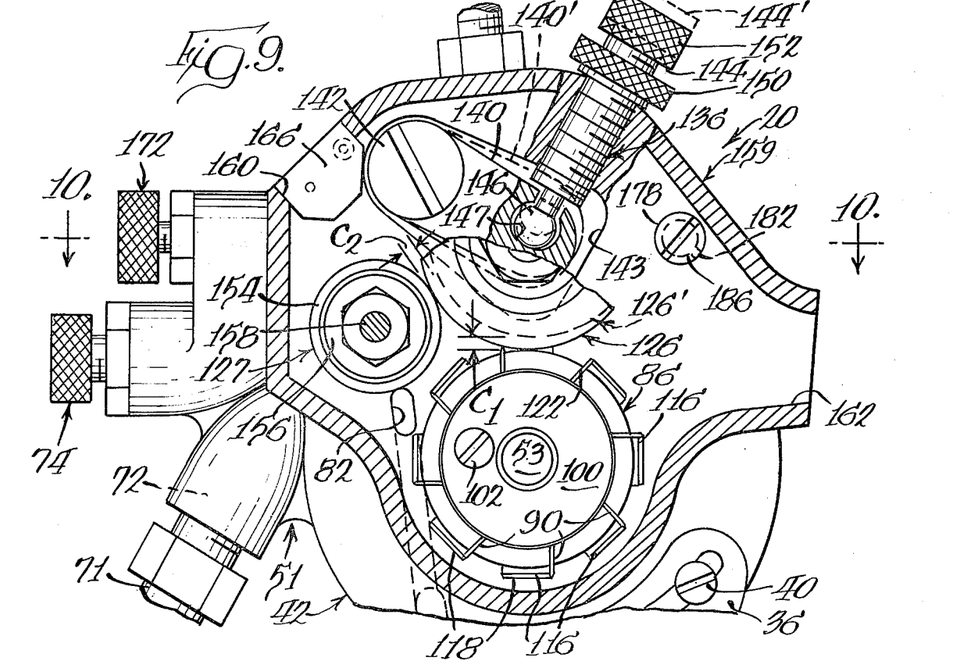
FIG. 9 is a vertical longitudinal section taken substantially along line 9—9 of FIG. 3.

As shown in FIGS. 3 and 9, the back-up roller 126 comprises an interior hub member 128 on which is mounted a replaceable cylindrical rubber or other resilient sleeve 130 of about the same outside diameter as the cutter roller 86. The hub member 128 contains a pair of ball bearings 132 for rotatably mounting the roller on a shaft 134 which is carried by the mounting plate 42 in a manner to be described. The roller 126 is held in proper location on the shaft 134 by a shoulder on the shaft adjacent the inner end thereof and by a retainer nut 135 at the outer end thereof, the shoulder and the nut engaging the inner races of the two bearings 132.

Means 136 are provided for adjusting the relative position of the friction roller 126, so as to adjust the clearance between the rollers 86 and 126, and thus, the cutting pressure the blades 116 exert on the roving. Preferably, the means 136 comprises a pivotal link 140 (FIG. 9) which at its lower inner end mounts the shaft 134 and which at its other end is pivotally mounted on the mounting plate 42 by a large flat head screw 142. The link 140 fits within recess 143 formed in the mounting plate 42 so as to prevent the link from protruding. The relative position of the link 140 may be altered by positive displacement adjustment means in the form of a screw 144, which is interlocked with the lower inner end of the link and is threaded through the plate 42 for adjustment from the exterior thereof.

The screw 144 has a ball-shaped head 146 on its inner end which fits in spherical recess or socket 147 formed in the link 140 so that the adjusting screw 144 and link 140 are positively connected together, the socket including a radial slot for passage of the stem connecting the screw and the ball head. The upper portion of the screw 144 is threadedly engaged in a threaded passage 148 formed through the mounting plate 42 and has a knurled lock nut 150 and an adjustment knob 152 thereon. Thus, by rotating the screw 144, the link 140, shaft 134 and friction roller 126 are positively moved in and out relative to the cutter roller 86, as indicated by dotted lines and primed reference numerals in FIG. 9. By loosening the lock nut 150, the knob 152 may be rotated, even and most particularly while the chopper is operating, to adjust the location of the back-up or friction roller 126 to obtain the optimum adjustment between the rollers 126 and 86 in terms both of roving feed and cutting or breaking action. Then, the lock nut is tightened down on the plate 42 to lock the screw and the roller 126 in the desired and proper location. The roller thereafter cannot move from its adjusted location and the cutting or breaking action is positive, and not reliant upon springs or spring pressure. Also, the adjustment is achieved entirely by hand without need for tools.

As will further be appreciated from FIG. 9, unlike prior art devices, movement of the roller 126 by the adjustment means 136 is such that approximately the same clearance is maintained between the idler roller 127 and friction roller 126, indicated at $C_2$, as maintained between the friction roller and cutter roller 86, indicated at $C_1$, so that the idler roller is not rendered ineffective by wearing and/or adjustment of the friction roller. This desirable result is achieved by the use of the pivotal adjustment and by selecting the proper locations for the roller 126 and the pivot point of the link 140.

The idler roller 127 is smaller than the other rollers, and comprises a tubular member 154 having a pair of bearings 156 which are mounted on a shaft 158. The inner end of the shaft 158 is threaded and secured to the mounting plate 42. The outer end of the shaft 158 carries a nut for retaining the roller on the shaft, and also has a threaded extension for a purpose to be described hereinafter.

A roving guide 166 is secured to the mounting plate 42, upwardly and rearwardly from, and has three openings 168 therein which lead toward, the bight between the friction roller 126 and idler roller 127. One or more strands of roving are lead through the roving guide holes 168 into the bight between the idler roller 127 and back-up roller 126 and into the bight between the back-up roller and cutter roller 86. Thus, as the cutter roller 86 is rotated by the air motor 44, the friction roller 126 and idler roller 127 are also rotated, pulling the roving into the cutter 20. The blades 116 cut the roving into short segments of fiber, which are then thrown horizontally forward from the cutter nd back-up rolls. The idler roller 127 cooperates with the back-up roller 126 to assure continuous feed of roving to the cutter rotor during cutting.

To protect personnel from injury and to confine the roving as it is being cut, the rollers 86, 126 and 127 are enclosed by a protective cover 159 of generally cup-shape. The cover is designed to fit conformably round the rollers and has a slot 160 therein for reception of the roving guide 166. A hole is formed in the outer wall of the cover in alignment with the idler roller shaft 158, and a thumb nut 164, which is rotatably trapped in the hole in the cover, is adapted to be threaded onto the shaft extension to detachably secure the cover to the remainder of the cutter. Forwardly of the rollers 126 and 86, the top and bottom walls of the cover are sloped convergently forward to define a generally rectangular outlet 162 for the chopped or cut fibers.

Figure 10:
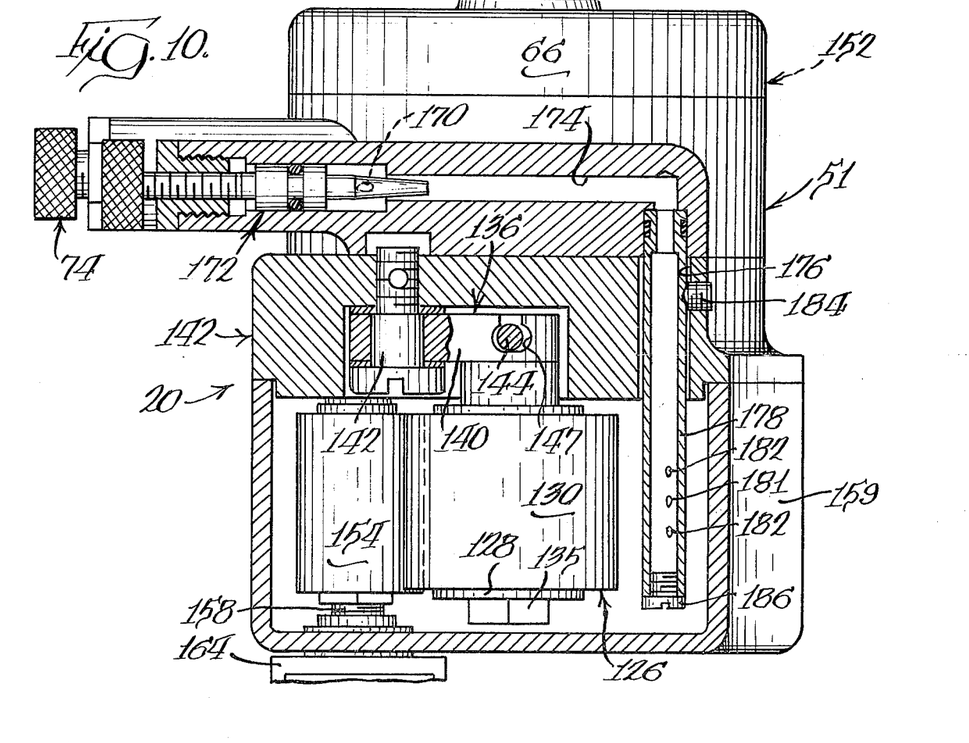
FIG. 10 is a horizontal section taken substantially along line 10—10 of FIG. 9.

After the roving is cut, the cut fibers are expelled from the cutter 20 (see FIG. 1) into the resin sprays of the spray gun 22 in such a manner as to assure good wetting of fibers with resin. Ideally, the spray pattern of the spray gun and the pattern of the cut fibers leaving the cutter should match. To assist in matching the pattern of the cut fibers discharged from the cutter to that of the spray gun, the cutter is provided with pattern adjusting means comprising air jet means directed into the cut fibers being discharged from the cutter. Preferably, the air supplied for this purpose is separate from that supplied to the air motor 44 so that adjustment of the pattern of the cut fibers will not alter the speed of rotation of the cutter roller and the amount of fiber being cut, or vice versa. As is shown in FIGS. 4 and 10, the air inlet passage 72 is intersected by a second air passage 170 which is not under the influence of the speed control valve 74. The flow through the passage 170 is controlled by a separate air valve 172 of the needle valve type, having a stem extending threading through the body 51 for manual adjustment from the exterior thereof independently of the valve 74. From the air valve 172, the air flows through a passage 174 formed in the central body 51 to a pattern control tube 178 located in an opening 176 in the mounting plate 42 and contained within the cover 159. The inner end of the tube 178 extends into the opening 176 and communicates with the passage 174. The central portion of the tube 178 has three openings therein, the center opening 181 being about one-sixteenth of an inch in diameter and the other openings 182 being about three-sixty-fourths of an inch in diameter. The center opening 181 is located approximately on the central vertical plane of the rollers 86, 126 and 127, while the adjacent openings 182 are about three-sixteenths of an inch from the opening 181. The openings 181 and 182 are preferably directed at an angle of about 45° toward the outlet 162 and are held in this position by a set screw 184 threadedly engaged in the mounting plate 42. The outer end of the tube 178 is plugged by a removable screw 186, which together with the set screw 184 facilitates removal and clening of the tube 178 should that become necessary.

To maintain internal cleanliness, some of the exhaust air from the motor 44 is vented through the passage 82 in the plate 42 to keep the rollers clean and in particular to blow loose fibers or fuzz off the blades 116 as they move into cutting position.

The operation of the cutter 20 of the present invention will now be described in conjunction with the spray gun 22. Assume that the cutter has been installed on the spray gun 22, roving 169 has been threaded through the cutter 20, and sharp blades 116 have been installed, as previously described. The operator holds the assembled cutter 20 and spray gun 22 by the spray gun handle with one hand and has his other hand free. The operator squeezes the trigger 34 of the gun, and resin sprays 171 and 172 and cut roving 173 are discharged from the gun and cutter. If necessary, the operator loosens screws 38 and 40 to properly adjust the cutter relative to the gun and then tightens the screws. The operator then adjusts the air motor speed control valve 74 so that the rate of discharge of roving is matched to the rate of discharge of resin from the gun. If necessary, the operator adjusts the clearance between the cutter roller 86 and friction roller 126 nd between the friction roller 126 and idler roller 127 while the cutter 20 is operated by turning the adjustment screw 144 and locking it in the desired position. Finally, the operator adjusts the air jets controlling the pattern of the cut roving by turning the valve 172 so that the pattern of the expelled cut fibers matches that of the resin spray gun. All these operations are easily carried out by the operator since he has one free hand and all the adjustments are easily accessible. After satisfactory adjustments are made, the cutter 20 and spray gun 22 can be directed onto the work. Should it become necessary, periodic changes or adjustments can be made in motor speed, roller contact, blade cutting pressure, and the pattern of the cut roving without having to cease operation.

While only one embodiment of the present invention has been fully described and illustrated, it should be understood that variations, modifications and rearrangements may be made therein without departing from the scope of the invention as defined by the appended claims.

What is claimed is:

1. A roving cutter comprising an integrated air motor and cutting means driven thereby, characterized by:
  a unitary mounting plate located between the air motor and the cutting means, said mounting plate defining part of an air motor rotor cavity on one side thereof and mounting means for the cutting means on the other side thereof.
  said air motor including a hollow body having an opening therein mounted on said one side of said plate and defining therewith an air motor rotor cavity, a rotor rotatably mounted in said cavity and having a shaft rotatably supported in and extending through said plate to said other side thereof, air passages in said body and said plate for conducting compressed air to said cavity for driving said rotor.
  said cutting means including a cutter roller mounted on said shaft at said other side of said mounting plate and driven thereby, a back-up roller rotatably mounted on said mounting plate at said other side thereof in parallel relation to said cutter roller, and means on said other side of said mounting plate for feeding roving between said cutter roller and said back-up roller, said cutter roller cooperating with said back-up roller to cut the roving into short segments.

2. A roving cutter as set forth in claim 1, wherein said cutter roller is a unitary assembly and includes a quick-detachable connection between said shaft and said cutter roller facilitating replacement and servicing of said cutter roller as a unitary assembly.

3. A roving cutter as set forth in claim 1, said cutter roller having a plurality of generally radial slots in its periphery each adapted for slidable reception of a cutter blade, each cutter blade having an exposed cutting edge extending completely across said cutter roller and a recess in each end thereof radially inward of its cutting edge, said cutter roller having lips adjacent its opposite ends engaging in said recesses to retain the blade on the roller, at least one of said lips comprising a ring detachably secured to the outer end of said roller and removable therefrom to facilitate blade replacement.

4. A roving cutter as set forth in claim 1, including means adjustably mounting said back-up roller on said other side of said plate for movement toward and away from said cutter roller, and positive displacement adjustment means for fixing the position of said back-up roller relative to said cutter roller.

5. A roving cutter as set forth in claim 4, said positive displacement adjustment means including manually operable extending to the exterior of said body means and said plate for adjusting said back-up roller during operation of the cutter.

6. A roving cutter as set forth in claim 1, including air jet means mounted on said other side of said plate adjacent the outlet side of said cutter roller for shaping the pattern of the cut segments of roving, and second air passages in said body and said plate for conducting compressed air to said air jet means.

7. A roving cutter as set forth in claim 6, including first valve means for controlling the supply of air to said rotor cavity via the first-named air passages independently of the supply of air to said second air passages, and second valve means for controlling the supply of air to said second air passages independently of the supply of air to said first air passages, said first and second valve means each including means extending to the exterior of said body and said plate for independently and selectively adjusting the respective valve.

8. A roving cutter as set forth in claim 1, wherein said rotor shaft is of non-circular cross-section outwardly of said other side of said mounting plate, said cutter roller has a central bore complementary to and slidably but non-rotatably received on said shaft, and snap-on connecting means is provided between said shaft and said roller for quickly releasably securing said roller to said shaft, whereby said roller may be easily removed from said shaft for replacement as a unit or for replacement of the blades thereon.

9. A roving cutter comprising an integrated air motor and cutting means driven thereby, characterized by:
  a unitary mounting plate located between the air motor and the cutting means, said mounting plate defining part of an air motor rotor cavity on one side thereof and mounting means for the cutting means on the other side thereof,
  said air motor including a hollow body having an opening therethrough mounted on said one side of said plate and defining therewith an air motor rotor cavity, a rotor rotatably mounted in said cavity and having a shaft rotatably supported in and extending through said plate to said other side thereof, first air passages in said body and said plate for conducting compressed air to said cavity for driving said rotor.
  said cutting means including a cutter roller mounted on said shaft at said other side of said mounting plate, a back-up roller adjustably mounted on said mounting plate at said other side thereof in parallel relation to said cutter roller, a feed roller mounted on said mounting plate at said other side thereof in parallel relation to said back-up roller, positive displacement adjustment means for fixing the position of said back-up roller relative to said cutter roller and said feed roller, said adjustment means including manually operable means extending to the exterior of said body and said plate for adjusting said back-up roller during operation of the cutter, said feed roller cooperating with said back-up roller for feeding roving to said cutter roller and said cutter roller cooperating with said back-up roller to cut the roving into short segments, air jet means on said other side of said mounting plate adjacent the outlet side of said cutter roller for shaping the pattern of the cut segments of roving, second air passages in said body and said plate for conducting compressed air to said air jet means,
  first valve means for controlling the supply of air to said first air passages independently of the supply of air to said second air passages, and second valve means for controlling the supply of air to said second air passages independently of the supply of air to said first air passages, said first and second valve means each including means extending to the exterior of said body and said plate for independently adjusting the respective valve during operation of the cutter to independently adjust the speed of said rotor and cutter roller and the pattern of the cut segments of roving.

10. A roving cutter as set forth in claim 9, including a cover for said rollers detachably secured to said other side of said plate, said cover including convergent portions adjacent the outlet sides of said cutter roller and said air jet means defining a discharge nozzle for the cut segments of roving and cooperating with said air jet means for shaping the pattern of the cut segments of roving discharged therefrom.

11. A roving cutter as set forth in claim 10, said cover having a quick-detachable mounting on said plate, said cutter roller having a quick-detachable mounting on said rotor shaft, and said back-up roller having a replaceable resilient sleeve thereon, whereby the cutter can be quickly and easily serviced.

* * * * *